United States Patent [19]

Lerner

[11] Patent Number: 4,745,658

[45] Date of Patent: * May 24, 1988

[54] POULTRY HOLDING MECHANISM WITH IMPROVED WING HOOKS

[75] Inventor: Hershey Lerner, Aurora, Ohio

[73] Assignee: Automated Packaging Systems, Inc., Twinsburg, Ohio

[*] Notice: The portion of the term of this patent subsequent to Mar. 18, 2003 has been disclaimed.

[21] Appl. No.: 817,421

[22] Filed: Jan. 31, 1986

Related U.S. Application Data

[63] Continuation of Ser. No. 572,455, Jan. 20, 1984, Pat. No. 4,575,901.

[51] Int. Cl.$^4$ .............................................. A22C 21/00
[52] U.S. Cl. ......................................... 17/11; 17/44.2
[58] Field of Search ....................... 17/11, 52, 44.2, 44

[56] References Cited

U.S. PATENT DOCUMENTS

| | | |
|---|---|---|
| 1,536,782 | 5/1925 | Focke . |
| 2,643,778 | 6/1953 | Socke . |
| 2,941,238 | 6/1960 | Reeves . |
| 2,967,198 | 10/1960 | Cianciolo et al. . |
| 3,132,373 | 5/1964 | Altenpohl . |
| 3,518,717 | 7/1970 | Johnson et al. . |
| 3,564,644 | 2/1971 | Cannon . |
| 3,624,863 | 7/1971 | Gasbarro . |
| 3,665,553 | 5/1972 | Colosky . |
| 3,675,272 | 7/1972 | Schact . |
| 3,722,032 | 3/1973 | Draper et al. . |
| 3,787,926 | 1/1974 | Schact . |
| 3,916,484 | 11/1975 | Kennedy . |
| 3,943,600 | 3/1976 | Cramer . |
| 3,946,461 | 3/1976 | Martin . |
| 3,950,820 | 4/1976 | Duncan et al. . |
| 4,016,624 | 4/1977 | Martin et al. . |
| 4,019,223 | 4/1977 | Baker . |
| 4,050,118 | 9/1977 | Wenzel ................................. 17/54 |
| 4,067,085 | 11/1978 | Gasbarro . |
| 4,083,083 | 4/1978 | Duncan et al. . |
| 4,178,659 | 12/1979 | Simonds . |
| 4,184,229 | 1/1980 | Soran . |
| 4,214,345 | 7/1980 | Duncan et al. . |
| 4,251,901 | 2/1981 | Thomas et al. . |
| 4,270,243 | 5/1981 | Lewis . |
| 4,271,561 | 6/1981 | Lewis . |
| 4,306,335 | 12/1981 | Hawk et al. . |
| 4,373,232 | 2/1983 | Harding et al. . |
| 4,406,037 | 9/1983 | Hazenbroek ........................... 17/11 |
| 4,407,046 | 10/1983 | Wright . |
| 4,424,608 | 1/1984 | Martin . |
| 4,468,838 | 9/1984 | Sjostrom et al. . |
| 4,505,002 | 3/1985 | Tieleman . |
| 4,575,901 | 3/1986 | Lerner ................................ 17/52 X |
| 4,616,380 | 10/1986 | Tieleman ............................... 17/11 |

Primary Examiner—Willie G. Abercrombie
Attorney, Agent, or Firm—Watts, Hoffmann, Fisher & Heinke Co.

[57] ABSTRACT

A stretching mechanism of a device for cutting slaughtered poultry, said mechanism being provided with a support member with a support face for the bird, with means to hang the bird by the legs, with fixed hooks for the wings of the bird and with movable wing hooks cooperating therewith and with means to hold the trunk of the bird on the support face, said holding means including a movable centering fork, which is operable to engage the spine of the bird at the inside of the trunk and which is vertically and horizontally movably guided in guide slots in the support member between an inoperative position and an operative position by means of a guide bar and two transverse bars fixed thereto. According to the invention the movable wing hooks are provided with a take-up member for the wings of the bird and with a cam surface, which during the movement of the centering fork cooperates forcedly with a part fixed to the centering fork, such that the take-up member is open in the inoperative position of the centering fork and cooperates with the fixed wing hook in the operative position of the centering fork.

2 Claims, 4 Drawing Sheets

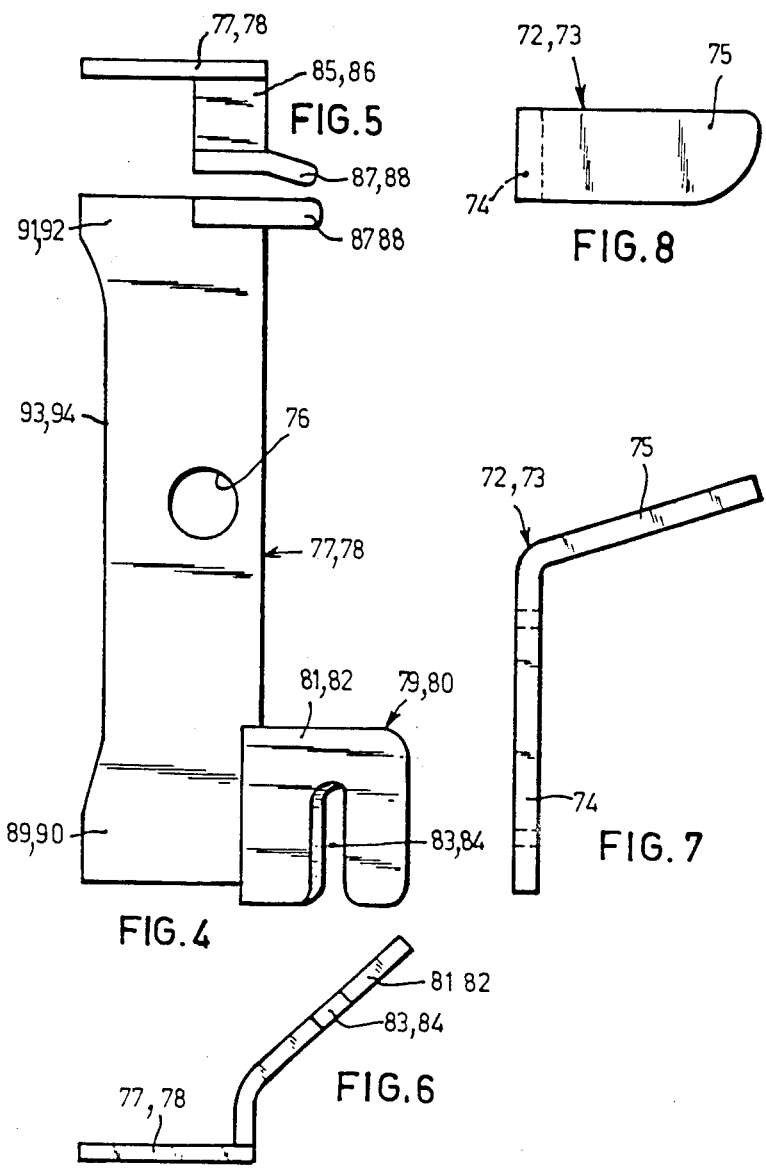

4,745,658

POULTRY HOLDING MECHANISM WITH IMPROVED WING HOOKS

REFERENCE TO RELATED CASES

This is a continuation of application Ser. No. 572,455, filed Jan. 20, 1984, now U.S. Pat. No. 4,575,901.

This specification discloses improvements to the apparatus disclosed in U.S. Pat. Nos. 4,406,037 and 4,505,022, both of which are incorporated herein by reference.

BACKGROUND AND SUMMARY

The present invention relates to a stretching mechanism of a device for cutting slaughtered poultry, said mechanism being provided with a support member with a support face for the bird, with means to hang the bird by the legs, with fixed hooks for the wings of the bird and with movable wing hooks cooperating therewith and with means to hold the trunk of the bird on the support face, said holding means including a movable centering fork, which is oparable to engage the spine of the bird at the inside of the trunk and which is vertically and horizontally movably guided in guide slots in the support member between an inoperative position and an operative position by means of a guide bar and two transverse bars fixed thereto.

Such a stretching mechanism is described in U.S. Pat. No. 4,505,002. In this earlier proposed stretching mechanism the fixed wing hooks which are fastened to the support member cooperate with the movable wing hooks which are fastened to triangular supports of the centering fork on the guide bar. The bird is firstly hung by its knee-joints onto U-shaped suspension hooks and the wings are hooked below the fixed wing hooks. When the centering fork moves to its operative position, the wings of the bird are locked against the fixed wing hooks by movable wing hooks of the centering fork. However, with this mechanism the wings of the bird should be pulled rearwardly by hand, which requires a rather great effort. This involves loss of time and reduces the production rate of the cutting device.

The present invention tends to abolish the disadvantages of this earlier proposed stretching mechanism.

This object is achieved in that in accordance with the invention the movable wing hooks are provided with a slotted member for the wings of the bird and with a cam surface, which during the movement of the centering fork cooperates forcedly with a part fixed to the centering fork, such that the slotted member is open in the inoperative position of the centering fork and cooperates to hold a wing with the fixed wing hook in the operative position of the centering fork.

By applying these measures, the wings of the slaughtered birds can be hooked without effort in the slotted members of the movable wing hooks and can be released by the person loading the mechanism, whereafter the movable wing hooks swing into their operative position where the wings of the bird are locked in the slotted members of the movable wing hooks by the fixed wing hooks. Therewith an increase of the production rate of about 25% is obtained, i.e. that with the stretching head in accordance with the invention about 300 birds more can be hung per hour than with the earlier porposed stretching head in accordance with U.S. Pat. No. 4,505,002.

The invention will be further elucidated with the aid of some embodiments on the basis of the drawings.

BRIEF DESCRIPTION OF THE DRAWINGS

FIG. 4 is a side view of a movable wing hook of the stretching head in accordance with the invention.

FIG. 5 is an upper view of the wing hook in accordance with FIG. 4, and

FIG. 6 is a lower view of the wing hook in accordance with FIG. 4.

FIG. 7 is an upper view of a fixed wing hook of the stretching head and

FIG. 8 is a front view of the fixed wing hook in accordance with FIG. 7.

DETAILED DESCRIPTION

The stretching mechanism or the stretching head in accordance with the invention is provided with a frame 1 which comprises two parallel plates 2 and 3 of strong, wear-resistant and preferably hygienic material, preferably nylon. Between the plates 2 and 3 two or more spacer elements 4 and 5 are placed and the plates 2 and 3 are fixedly interconnected by bolts 6. If necessary, spacer rings are placed on the bolts 6 between plates 2 and 3. In the same manner as with the stretching mechanism in accordance with the U.S. Pat. No. 4,505,002 the plates 2 and 3 of the frame 1 are secured to the free end of a radial processing arm of a device for cutting slaughtered poultry, said device being provided with various, for instance eight, processing arms with stretching heads disposed in the configuration of a roundabout (not illustrated).

Figure 2:
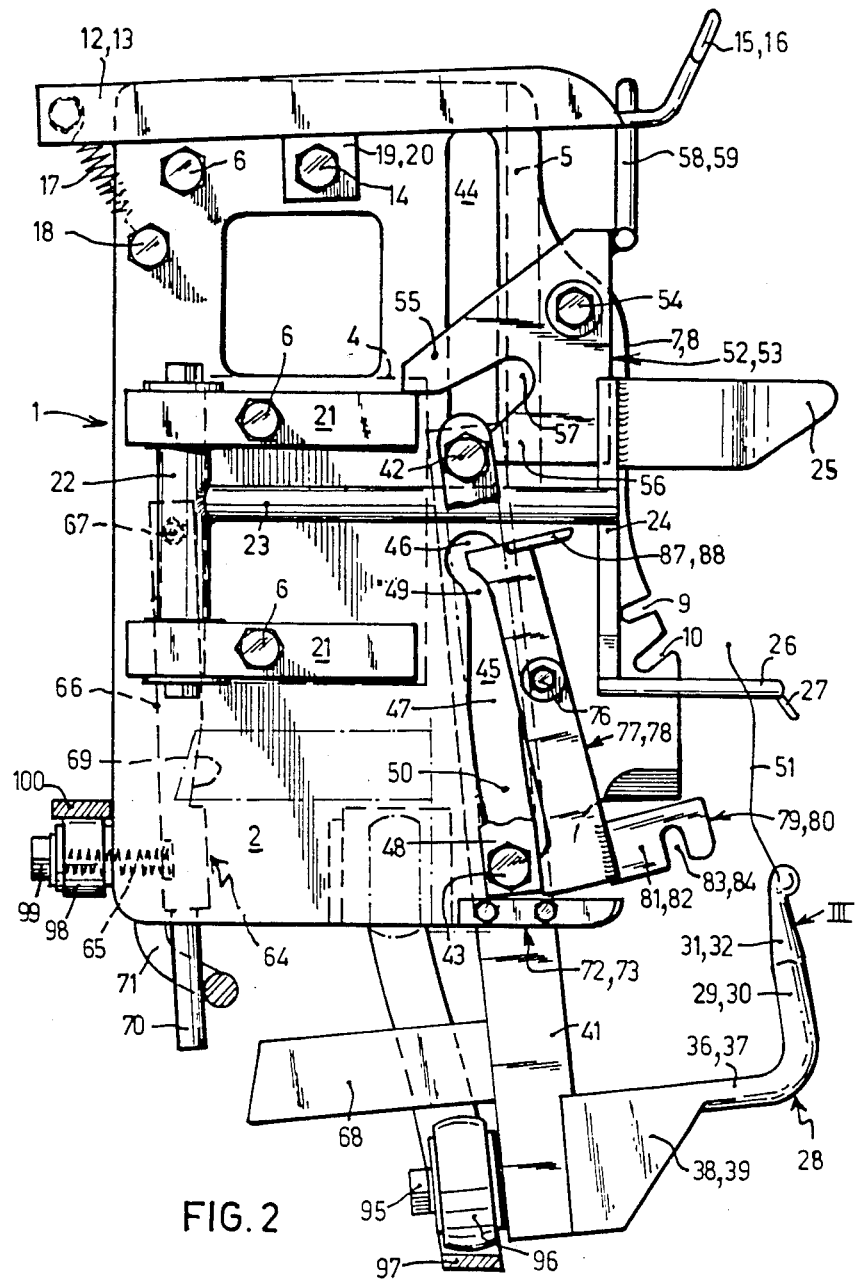
FIG. 2 is a side view of the stretching mechanism in accordance with the invention in the inoperative or out-of-operation position of the centering fork.

In FIG. 2, at their right-hand side surface, the plates 2 and 3 form the radial outer surface of the stretching head. The plates 2 and 3 are provided with a support surface 7 and 8 respectively, for the back of the bird which extends along the major part of the height of the plates 2 and 3. In the support surface 7, 8 recesses 9 and 10 are provided, into which knives for cutting loose parts of the slaughtered bird are adapted to move, and the knife to cut the bird longitudinally in two parts can move through the slot 11 between the two support faces 7 and 8 of the frame plates 2 and 3.

At its upper side the stretching mechanism is provided with a suspension device comprising a double two-armed lever 12 and 13, which is pivoted on a transverse shaft 14, protruding through the plates 2 and 3, and said lever being provided at its outside with U-shaped suspension hooks 15, 16 for the legs of the bird. At the inside, the levers are provided with a pull spring 17, which at the one end is secured to the lever 12, 13 and tends to turn same in counter-clockwise direction, and at the other end it is secured to a transverse pin 18. On the lever 12, 13 transverse plates 19 and 20 are secured, which are fastened on the rotatable transverse shaft 14 by means of nuts.

At both sides of the frame plates 2, 3 support blocks 21 are provided, which are secured by means of the continuous bolts 6. Between the support blocks 21 a transverse shaft 2 is mounted, which is provided with a radial support arm 23, to which a transverse bar 24 is secured, carrying at its upper end a support plate 25 for the rump parts and at its lower end a support bar 26 for the trunk of the bird. At the free ends of the support bars 26, which are bent inwardly, there is an inwardly and downwardly directed pin 27 provided with a sharp tip. The pins 27 engage into the trunk of the bird and hold same during and after cutting, so that the parts do not fall out of the head before the stretching head is opened.

The stretching head according to the invention is provided with a symmetrical centering fork 28, which is movably guided in a plane perpendicular to the support surface 7, 8 in a plane parallel to the plane of the drawing in FIG. 2. The centering fork 28, in its operative end position, illustrated in FIG. 1 where it, engages the spine at the inside of the bird's trunk. The centering fork 28 moves from the inoperative position, illustrated in FIG. 2, via an opening in the bird's chest into its trunk in the operative position in accordance with FIG. 1.

Figures 1, 3:
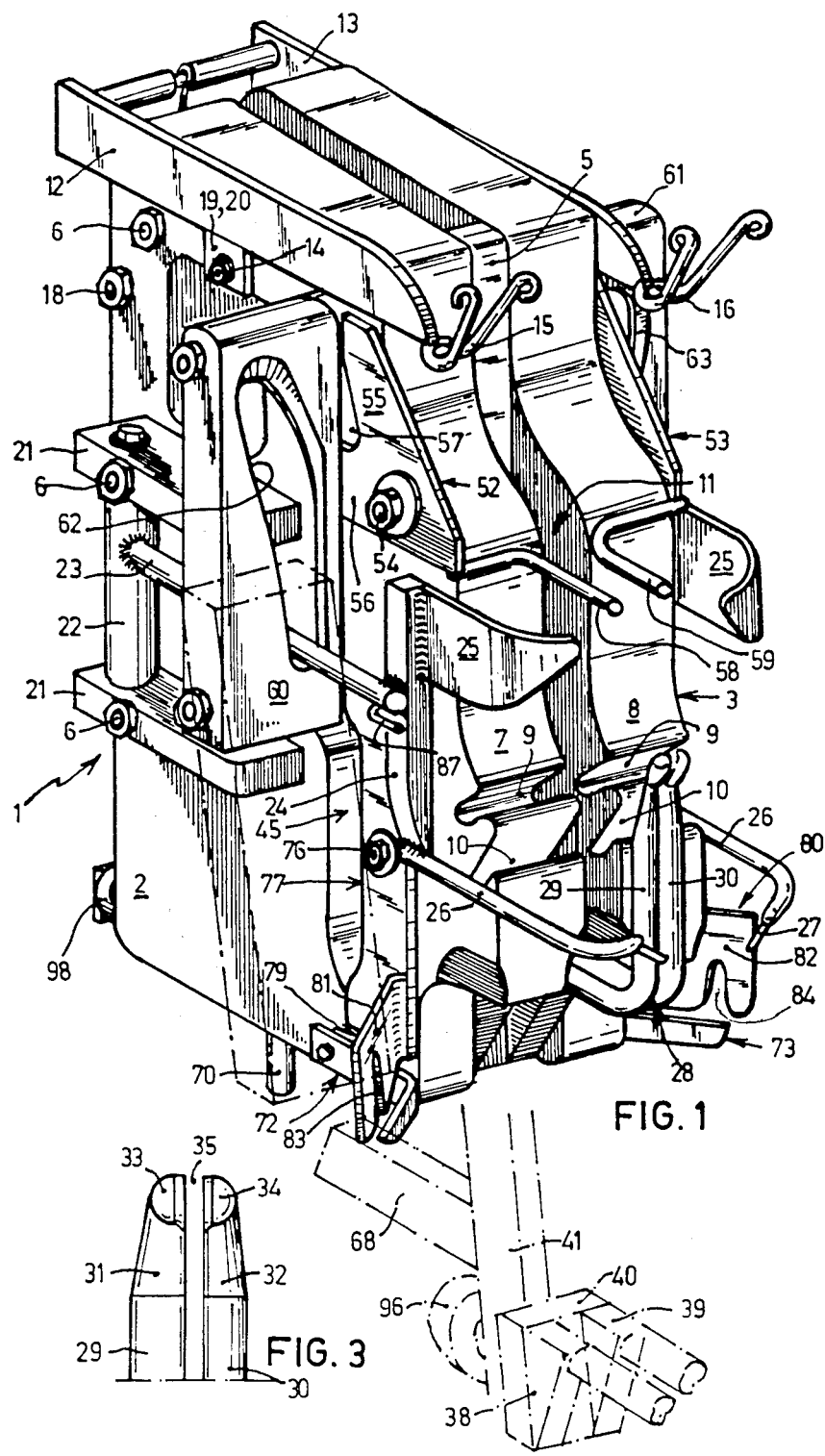
FIG. 1 is a perspective view of the stretching mechanism in accordance with the invention in the operative end position of the centering fork.
FIG. 3 is a view of the centering fork in accordance with the arrow III in FIG. 2.

The symmetric centering fork 28 is provided with two parallel teeth 29 and 30 with a round cross-section having taperingly thinned sections 31 and 32 respectively at their free end, said sections ending in semi-spherical heads 33 and 34 respectively, and which, in the operative position of FIG. 1, engage at both sides of the sectionally sharp V-shaped spine of the bird. From FIG. 3 it appears that the two parallel teeth 29 and 30, the tapered sections 31 and 32 and the semi-spherical heads 33 and 34 define a narrow gap 35, having the same width along its entire length. This gap 35 serves to let the knife (not illustrated) pass to cut the bird longitudinally in two halves. The gap 35 has a width of about 5 mm and the knife has a thickness of about 3 mm. The two parallel teeth 29 and 30 and/or the tapered sections 31 and 32 are possibly flattened at the inside then. In the operative position of the centering fork 28, the sharp V-shaped spine of the bird protrudes into the gap 35.

By means of a square headed section 36 and 37 respectively, the teeth 29 and 30 are secured onto triangular supports 38 and 39 respectively, which are welded or otherwise secured to a support plate 40, which is mounted on the lower end of a guide bar 41.

The guide bar 41 is provided with two parallel transverse bolts, the shanks of which provide bars 42 and 43, FIG. 2, which are vertically spaced. The upper transverse bar 42 is vertically slidable up and down in an upper straight slot 44 in the two frame plates 2 and 3, which is substantially parallel to the major part of the support surface 7, 8 of the bird. The lower transverse bar 43 is slidable in a lower slot 45 in the two frame plates 2 and 3, consisting of three straight sections 46, 47 and 48 which are parallel to the upper slot 44 and which extend in a staggered manner relative to each other and are interconnected by transition sections 49 and 50 of the same width. The upper section 46 of the lower slot 45 is substantially aligned with the upper slot 44. The sections 47 and 48 are disposed where they will move the guide bar 43 laterally when the fork moves from the operative position of FIG. 1 to the inoperative position of FIG. 2. During this movement, there is an increase in the horizontal distance between the centering fork 28 and the support surface 7, 8.

In the operative position of FIG. 1 the transverse bars 42 and 43 are located in the upper ends of the slots 44 and 45 respectively, and in the inoperative position of FIG. 2 the transverse bars 42 and 43 are located in the lower ends of the slots 44 and 45 respectively, as appears from FIGS. 1 and 2. The course described by the centering fork 28 upon its movement from the position of FIG. 2 into the position of FIG. 1, is indicated at 51 in FIG. 2.

Figure 10:
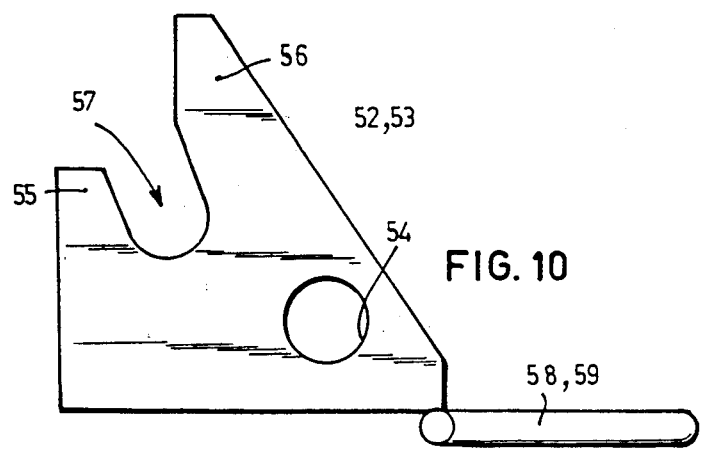
FIG. 10 is a side view of a pressing lever of the stretching head in accordance with the invention and FIG. 11 is a bottom view of the lever in accordance with FIG. 10.
Figure 11:
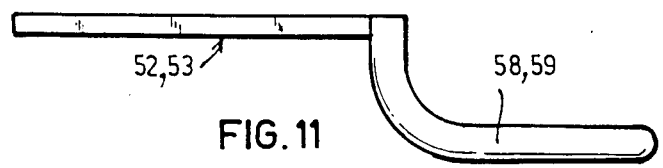

On the plates 2 and 3 at the outside near the support faces 7, 8 of the bird V-shaped levers 52 and 53, which are metal plates, are pivotally mounted on a transverse shaft 54, which is secured perpendicularly to the plates 2, 3; vide particularly the FIGS. 10 and 11. The V-shaped levers 52 and 53 are provided with U-shaped slots 57 of a predetermined shape between the legs 55 and 56 of the V and are provided with an L-shaped bar 58 and 59 at the tip of the V, with which the short legs of the L are welded to the levers 52 and 53 and are directed inwardly, whereas the long legs of the L are directed upwardly and forwardly respectively. The end portions of the U-shaped slot 57 include an angle of 90°.

In the open or inoperative position of the stretching head of FIG. 1 the one leg 55 of the V-shaped lever 52 is adjacent to the support block 21 whereas the other leg 56 with its end face is almost contacted by the upper transverse bar 42, so that the levers are fixed in this position.

During the movement of the guide bar 41 with the fork 28 from the position of FIG. 2 into the position of FIG. 1 the upper transverse bar 42 engages into the slot 57 and turns the levers 52 and 53 in clockwise direction about an angle of 90° into the position of FIG. 1, during which the upper transverse bar 42 firstly moves into the slot 57 and then out of the slot 57, so that the transverse bar 42 engages the end section of the one leg 55 in the position of FIG. 1 at the inside of the slot 57 and therewith has also lifted the levers 12 and 13 at the right-hand side of the pivot shaft 14 over a small distance so as to somewhat stretch the bird, which is put on the stretching head in longitudinal direction in this position of the stretching head. The short legs of the L-shaped bars 58 and 59 are adjacent to the support faces 7 and 8 then, so that the levers 52 and 53 are also fixed in this position.

During stretching the bird on the stretching head in the position of FIG. 2 the bird is hung by its knee-joints onto the U-shaped hooks 15 and 16 and is placed against the support faces 7, 8 with its rump parts and its trunk between the support plates 25 and the support rods 26 respectively. When the levers 52 and 53 are turned from the position of FIG. 2 into the position of FIG. 1, as described above, the long legs of the L-shaped bars 58 and 59 move between the rump parts and press these away from each other, and, which is more important, also force the bottom of the bird down, so that it is not damaged or partially cut off by the knife which cuts the legs from the rump parts as described in the U.S. Pat. specification No. 4,406,037. These L-shaped bars 58 and 59 also provide that the legs are cut off from the rump parts at the right place.

At opposite sides of the frame plates 2 and 3, cam plates 60 and 61 are secured on the transverse bars 42 and 43, which cam plates are provided with a cam slot 62 and 63 respectively, through which the support arms 23 protrude. Upon movement of the centering fork 28 from the inoperative position of FIG. 2 into the operative position of FIG. 1, the support arms 23 are turned inwardly by the cam slots 62 and 63, so that the support plates 25 and the support bars 26 are forced onto the bird's rump parts and trunk respectively.

Figure 9:
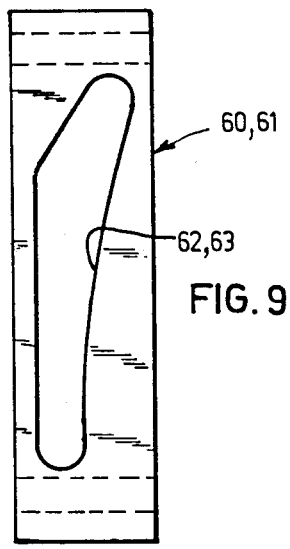
FIG. 9 is a front view of a cam plate of the stretching head.

The shape of the cam plate 61 and the cam slot 63 is illustrated in FIG. 9. The cam plate 60 has a similar shape, forming the mirror image of that of the cam plate 61 of FIG. 9. The cam plate 60 and 61 consist of two parts, vide FIG. 9, which are kept together by nuts screwed on the transverse bars 42 and 44.

A mechanism 64 is provided for the centering fork 28, locking the fork in the operative position of FIG. 1. The locking mechanism 64 consists of a locking bar 66, a tooth-shaped locking cam 68, and an unlocking pin 70. The locking bar 66 is loaded by a compression spring 65, said bar being pivotally mounted at 67 between the frame plates 2 and 3. The tooth-shaped locking cam 68, which is secured to the guide bar 41 and, in the operative end position of the centering fork 28, it engages in a notch 69 in the locking bar 66. The unlocking pin 70 cooperates with an unlocking cam 71 on the frame (not illustrated) of the cutting device. The tooth-shaped locking cam 68 has a somewhat smaller thickness than the distance between the plates 2 and 3 so that they guide the cam 68 practically without tolerance and thereby the centering fork 28 is held transversely in the right position relative to the bird's spine.

Fixed wing hooks 72 and 73 respectively, are fastened to the plates 2 and 3 at the outside on the front side, vide FIGS. 1, 2, 7 and 8. Each of the fixed wing hooks consists of a section 74 fastened to the plates 2 and 3 respectively, and a section 75 bent outwardly at an angle of about 75° relative thereto, said section 75 having rounded corners at its free end.

Approximately at the height of the support rods 26 for the bird's trunk a two-armed lever 77 and 78 respectively, is mounted on a pivot shaft 76 at the outside of the plates 2 and 3, said levers 77 and 78 being substantially equal and being mounted in mirror image relative to one another; vide the FIGS. 1, 2, 4, 5 and 6. The levers 77 and 78 respectively, are provided with a transversely protruding strips 79 and 80 respectively, on their lower arm at the outside near their front edges. For a minor part each strip is perpendicular to the lever, and the major parts 81 and 82 of the strips are bent forwardly at an angle of about 45°. The parts 81, 82 of the strips 79, 80 are provided with vertical U-shaped slots 83 and 84 respectively, opening into their lower edges, the corners of the recesses between the legs of the U and the lower edges of the strips 79, 80 being strongly rounded, and the corners at the end edge of the strips 79 and 80 being rounded too. The levers 77, 78 with the strips 79, 80 form the movable wing hooks, as will be elucidated hereinafter.

The levers 77, 78 are provided with welded or brazed transverse strips 85, 86 at their upper edges, and pins 87, 88 secured to the free end edge of the strips 85, 86. The lengths of the pins 87, 88 are such that in closed or operative position of the stretching head they engage behind the transverse bar 24 for the support plates 25 and the support rods 26 for the rump parts and the trunk respectively, of the bird, vide FIG. 1, so that the rod cannot move outwardly.

The levers 77 and 78 are provided with cams 89, 90 and 91, 92 at their rear edges and with rear faces 93, 94 which are operated by the lower transverse bar 43, as will be elucidated hereinafter. In the closed position of the stretching head of FIG. 1 the rear faces 93, 94 of the levers 77 and 78 are located substantially flush with the front edge of the corresponding section 47 of the slot 45.

The function and operation of the levers 77 and 78 with the strips 79, 80 and 85, 86 fixed thereto is as follows:

In the open or inoperative position of the stretching head of FIG. 2 the bird is hung by its knee-joints in the U-shaped suspension hooks 16, 16, supported with its back against the support face 7, 8 and the wings are hooked in the U-shaped recesses 83, 84 of the strips 79, 80. The cams 89, 90 are supported against the lower transverse bar 43 and the transverse strips 85 and 86 are almost supported against the front face of the cam plates 60 and 61, so that the levers 77 and 78 are fixed in a fixed position. Upon movement of the stretching head from the open position into the closed or inoperative position, which is illustrated in FIG. 1, the guide bar 41 is moved upwardly together with the lower transverse bar through the guide slot 45 and engages the rear face 93, 94 of the levers 77 and 78 approximately at the height of the pivot shaft 76. This turns said levers into the vertical position in FIG. 1, in which the cams 91, 92 are supported by the transverse bar 43 and the strips 85, 86 almost engage the rear side of the transverse bars 24, so that the levers are fixed also in this position. In this position of the levers 77 and 78 the strips 79 and 80 with the recesses 83, 84 are turned above the fixed wing hooks 72, 73, so that the wings of the bird are locked.

When the wings are cut off from the bird's trunk and the bird is cut otherwise into the desired pieces, as described in the U.S. Pat. specification No. 4,406,037, the stretching head is opened in a manner to be described hereinafter, in which the guide bar 41 with the transverse bar 43 is moved downwardly. Owing to the path of the guide slots 45 the levers 77 and 78 are not rotated and, consequently, the movable wing hooks 81, 82, 83 and 84 are not turned away from the fixed wing hooks 72 and 73, until the transverse bar 43 is moved in the transition portion 50 of guide slot 45 and thereafter in the straight end portion 48 of the guide slot 45. The transverse bars 24 cannot be moved outwardly with the supports 25 and 26 until the pins 87 and 88 have released the transverse bars 24. Thereby it is achieved that the separate cut parts of the bird are held on the stretching head as long as possible and that these parts cannot fall out of the stretching head too soon.

By using fixed wing hooks 72 and 73 respectively, in combination with the movable wing hooks formed by the levers 77, 78 with the strips 79, 80, the birds can be hung on the stretching head faster than with the stretching head in accordance with the U.S. Pat. No. 4,505,002, and an increase of the production rate of about 25% can be obtained; i.e. that with the present stretching head approx. 300 birds more can be hung and worked up per hour than with the earlier proposed stretching head in accordance with the U.S. Ser. No. 456,180.

At the lower end of the guide bar 41, opposite the centering fork 28, a roll 96, rotatable about a horizontal shaft 95, is secured. When the bird is hung with its legs in the hooks 15 and 16 and is hooked with its wings in the recesses 83, 84 in the movable wing hooks 79, 80, the roll 96 arrives on a guide 97 after a certain rotation of the processing arm of the cutting device (not illustrated), so that the guide bar 41 with the centering fork 28 moves upwardly and simultaneously pivots in clockwise direction in FIG. 2, until it reaches the operative position, illustrated in FIG. 2 in dotted lines and in FIG. 1 in drawn lines.

At the inner side of the stretching device, near the lower edge of the frame plates 2 and 3, two freely rotatable rolls 98 are mounted on shafts 99, secured in the frame plates 2 and 3. When the centering fork 28 is brought into the operative position, wherein also the support arms 23 with the support plates 25 and the support rods 26 have to be forced upon the slaughtered bird, said rolls 98 cooperate with a fixed guide 100 on the frame of the cutting device (not illustrated) which prevents the processing arm and/or other parts of the cutting device (not illustrated) from being permanently bent or otherwise deformed by the pressure of the guide 97 on the roll 96 when the centering fork 28 is moved upwardly and the support arms 23 are forced inwardly.

For clarification's sake FIG. 1 shows in dotted lines a portion of the centering fork 28 and the pertaining guide bar 41 in its inoperative position, whereas in FIG. 2 in dotted lines a part of the locking mechanism 64 and the actuating cam 97 is illustrated in the operative position.

In the stretching mechanism of the invention the frame plates 2 and 3, the transverse bars 42 and 43, the roll 96 and the rolls 98 are preferably made of nylon, whereas the remaining parts of the stretching mechanism are preferably made of stainless steel.

Although in the above description a preferred embodiment of the stretching mechanism of the invetnion is described, wherein the centering fork 28 is movably guided in two directions in the frame plates 2 and 3 of the support member, it is also possible in accordance with the invention to mount the centering fork 28 in a fixed manner relative to the processing arm and to guide (a part of) the support member, on which the bird is stretched, by means of guide tracks and follower rolls in a plane perpendicular to the support face 7, 8 in a movable manner in two directions relative to the fixed centering fork 28. With such an embodiment (not illustrated) of the stretching mechanism the same effect can be obtained as with the above described preferred embodiment, also illustrated in the drawing, of the stretching mechanism of the invention.

What is claimed is:

1. A mechanism for holding slaughtered birds in a poultry cutting machine, comprising:
    a support member having a support face which engages and supports a bird while the bird is being cut into pieces;
    means for holding the bird at a position where it lies against said support member;
    wing holding means comprising a pair of movable wing hooks and a pair of lock members, said wing hooks and lock members being supported for relative movement from an open position at which said wing hooks and locking members are spaced apart to a closed position at which a wing of a bird is held between one of said wing hooks and an associated locking member; and
    means for moving the wing hooks and the locking members between their open and closed positions.

2. The mechanism of claim 1 wherein said lock members are fixed and said wing hooks are movable towards and away from an associated lock member.

* * * * *